(12) United States Patent
Leppaniemi

(10) Patent No.: US 7,021,205 B2
(45) Date of Patent: Apr. 4, 2006

(54) PRODUCTION LINE FOR BREAD PREFORMS

(75) Inventor: Pekka Leppaniemi, Turku (FI)

(73) Assignee: Hydrovoima Oy, (FI)

( * ) Notice: Subject to any disclaimer, the term of this patent is extended or adjusted under 35 U.S.C. 154(b) by 77 days.

(21) Appl. No.: 10/488,765

(22) PCT Filed: Sep. 19, 2003

(86) PCT No.: PCT/FI03/00210

§ 371 (c)(1),
(2), (4) Date: Mar. 5, 2004

(87) PCT Pub. No.: WO03/099015

PCT Pub. Date: Dec. 4, 2003

(65) Prior Publication Data

US 2004/0258817 A1 Dec. 23, 2004

(30) Foreign Application Priority Data

May 27, 2002 (FI) ................................ 20020251 U

(51) Int. Cl.
*A21C 3/00* (2006.01)
(52) U.S. Cl. .................... 99/450.1; 99/450.2; 425/207; 425/297
(58) Field of Classification Search ............... 99/450.2, 99/450.1, 450.6, 450.7, 353–355, 386, 443 C, 99/443 R, 423, 426, 427, 432; 426/94, 138, 426/297, 500–502, 523, 496; 425/316, 377, 425/392, 363, 373, 207, 305.1, 297, 289, 425/496

See application file for complete search history.

(56) References Cited

U.S. PATENT DOCUMENTS

| 2,888,888 | A | | 6/1959 | Jorgenson et al. |
| 3,851,570 | A | * | 12/1974 | Charter ...................... 99/450.2 |
| 4,373,892 | A | | 2/1983 | Nordmann |
| 4,691,627 | A | * | 9/1987 | Roberts ..................... 99/450.6 |
| 4,741,263 | A | * | 5/1988 | Ueno et al. ................ 99/450.2 |
| 4,821,634 | A | * | 4/1989 | Swanson .................... 99/450.2 |
| 4,828,861 | A | | 5/1989 | Lammela |
| 4,905,583 | A | * | 3/1990 | Hayashi ..................... 99/450.2 |
| 4,996,915 | A | * | 3/1991 | Morikawa et al. ......... 99/450.2 |
| 5,018,439 | A | * | 5/1991 | Bordin ....................... 99/450.2 |
| 5,664,485 | A | * | 9/1997 | McDilda et al. ........... 99/450.2 |
| 5,687,641 | A | * | 11/1997 | Williamson et al. ....... 99/450.2 |
| 5,862,743 | A | * | 1/1999 | Cimenti ..................... 99/450.2 |
| 6,237,473 | B1 | * | 5/2001 | Morikawa .................. 99/450.2 |
| 6,477,943 | B1 | * | 11/2002 | Janecka ....................... 99/355 |
| 6,764,295 | B1 | * | 7/2004 | Jensen et al. ............... 425/316 |

FOREIGN PATENT DOCUMENTS

EP 0 118 264 A1 9/1984
GB 1 538 675 1/1979

* cited by examiner

Primary Examiner—Timothy F. Simone
(74) Attorney, Agent, or Firm—Connolly, Bove, Lodge & Hutz LLP

(57) ABSTRACT

A production line for bread blanks comprising a dough dispenser unit with a first rolling unit for preparing a dough sheet; a first conveyor receiving the dough sheet; at least one spreading/rolling unit operable in conjunction with the first conveyor, each unit having a spreader roll facing the underside surface of the conveyor and a backing roll in direct contact with the top surface of the dough sheet; a second rolling unit at the exit end of the first conveyor for trimming the dough sheet; a second conveyor receiving the trimmed dough sheet and; forming/releasing means operable in conjunction with the second conveyor for forming/releasing bread blanks from the trimmed dough sheet.

20 Claims, 2 Drawing Sheets

PRODUCTION LINE FOR BREAD PREFORMS

BACKGROUND OF THE INVENTION

The present invention relates to a production line for bread preforms or blanks.

Prior-art production lines have been hampered by being entirely incapable of rolling sticky doughs, such as rye bread dough, why a dough sheet after rolling still contains high internal stresses. Improvers must be added to the dough in order to secure the rising of the dough. For forming bread blocks, these prior-art production lines have generally used so-called press molding that needs additional dusting of molds with flour. One of the problems caused by this step is higher particulate matter content of interior air in bakeries. Moreover, the control of picking equipment and press indexing used on a conventional bread-making line are based on mechanical control means.

BRIEF SUMMARY OF THE INVENTION

It is an object of the present invention to eliminate the above-mentioned problems by virtue of a production line for bread blanks comprising:
 a dough dispenser unit with a first rolling unit cooperating with the same for preparing a dough sheet;
 a first conveyor for receiving the dough sheet;
 one or more successive spreading/rolling unit arranged operable in conjunction with the first conveyor in such a fashion that a spreader roll of each unit is located facing the underside surface of the conveyor with a backing roll of the unit positioned above the conveyor in a direct contact with the top surface of the dough sheet;
 a second rolling unit arranged to the exit end of the first conveyor for trimming the dough sheet to its final width and thickness;
 a second conveyor for receiving the trimmed dough sheet; and
 operable in conjunction with the second conveyor a forming/releasing means for forming/releasing bread blanks from the trimmed dough sheet traveling along with the second conveyor.

According to a preferred embodiment of the invention, the bread blank forming/releasing means comprises two successively operable stamping units with changeable forming molds having the stamping movement of the units adapted compliant to the movement of the dough sheet, that is, to the movement of the second conveyor.

The production line according to the invention is capable of providing a stress-relieved dough sheet thus assuring a good quality of the end product. Inasmuch as the spreading rolls are not in direct contact to the dough, the production line is also suitable for rolling sticky dough formulations. The water content of the dough can be increased and the use of dough improvers becomes unnecessary. The forming of bread blanks is carried out without supplementary flour dusting of molds, whereby particulate matter content in the operating environment is lowered. Moreover, the amount of undesirable dry flour in the product itself is reduced thus making the product to retain its freshness longer. The baking temperature can be lowered by about 10° C. offering substantial energy savings. Forming is carried out by a linear movement, which is a more accurate and faster technique than the conventional method of forming based on a gravity-actuated stamping arm.

In the production line, downstream in the travel direction of the dough sheet, the forming/releasing means of bread blanks is followed by a return line of dough sheet scraps for returning excess dough to the dough dispenser hopper of the production line, wherein the picking of the dough sheet edge scraps and stamped hole pieces of dough is arranged to take place by electrical control means.

As an optional accessory, the bread blank forming/releasing means may also include a rotary cutter making it suitable for producing bread blanks with the shape of a pizza crust.

The receiving ends of the production line's first and second conveyors are arranged at a distance from the point at which the dough sheet comes into contact with the respective conveyor. Hence, a flour duster can be adapted above the receiving ends of both conveyors for dusting the surface of the respective conveyor before the instant the dough sheet is received thereon. Advantageously, the receiving end of the second conveyor is tilted downward by means of tack turning rollers into a ramping position forming an acute angle with the horizontal plane. In a preferred embodiment, this acute ramping angle is about 30°. Using this arrangement the flour duster of the second conveyor can be readily adapted under the rolling units of the production line, thus reducing the footprint need of the production line.

Immediately downstream of the first rolling unit and, possibly, also after the second rolling unit, a flour duster is arranged for dusting the top surface of the rolled dough sheet. In the case that a flour duster is arranged also downstream of the second rolling unit, the production line may be additionally provided with a dusting brush downstream of this latter flour duster, whereby the dusting brush serves to smooth the flour layer dusted onto the dough sheet.

The separated bread blanks are next moved by means of the second conveyor downstream either directly into a baking oven or, alternatively, if the exit end of the second conveyor is constructed as a bread blank loader, onto oven shelves.

BRIEF DESCRIPTION OF THE DRAWING

Next, the invention will be described in greater detail with reference to the attached drawings, wherein.

DETAILED DESCRIPTION OF THE INVENTION

Figure 1:
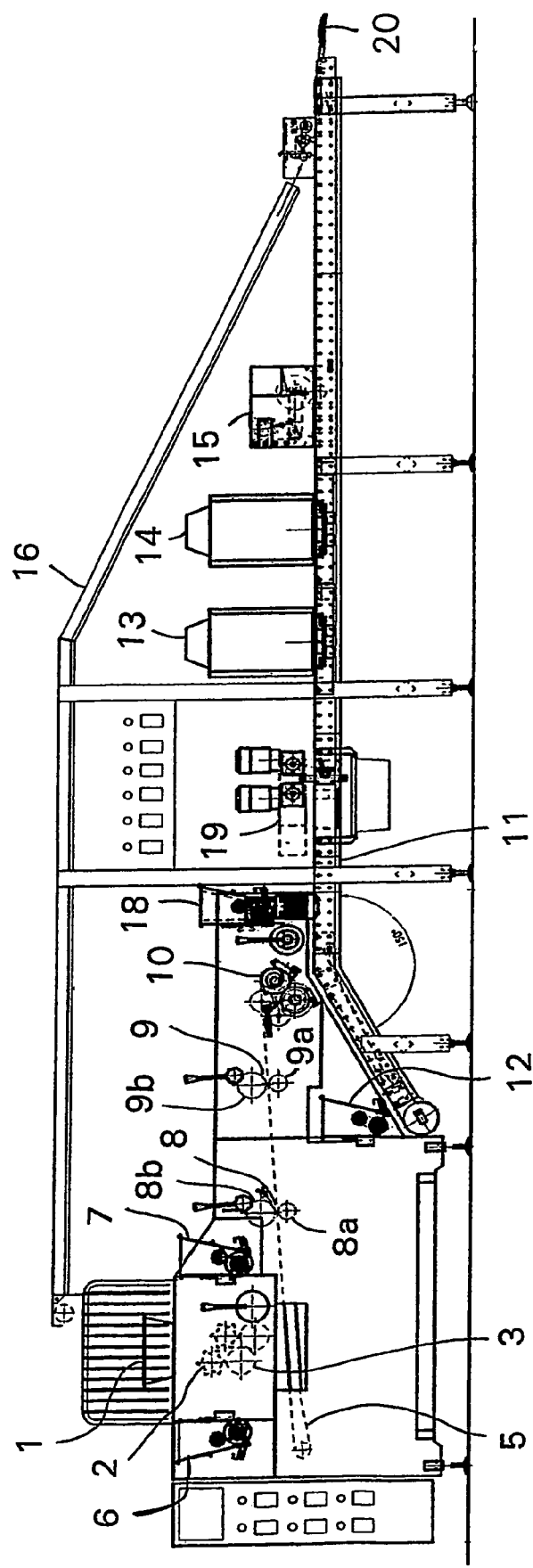
FIG. 1 shows an elevation side view of one example of a bread blank production line according to the invention.
Figure 2:
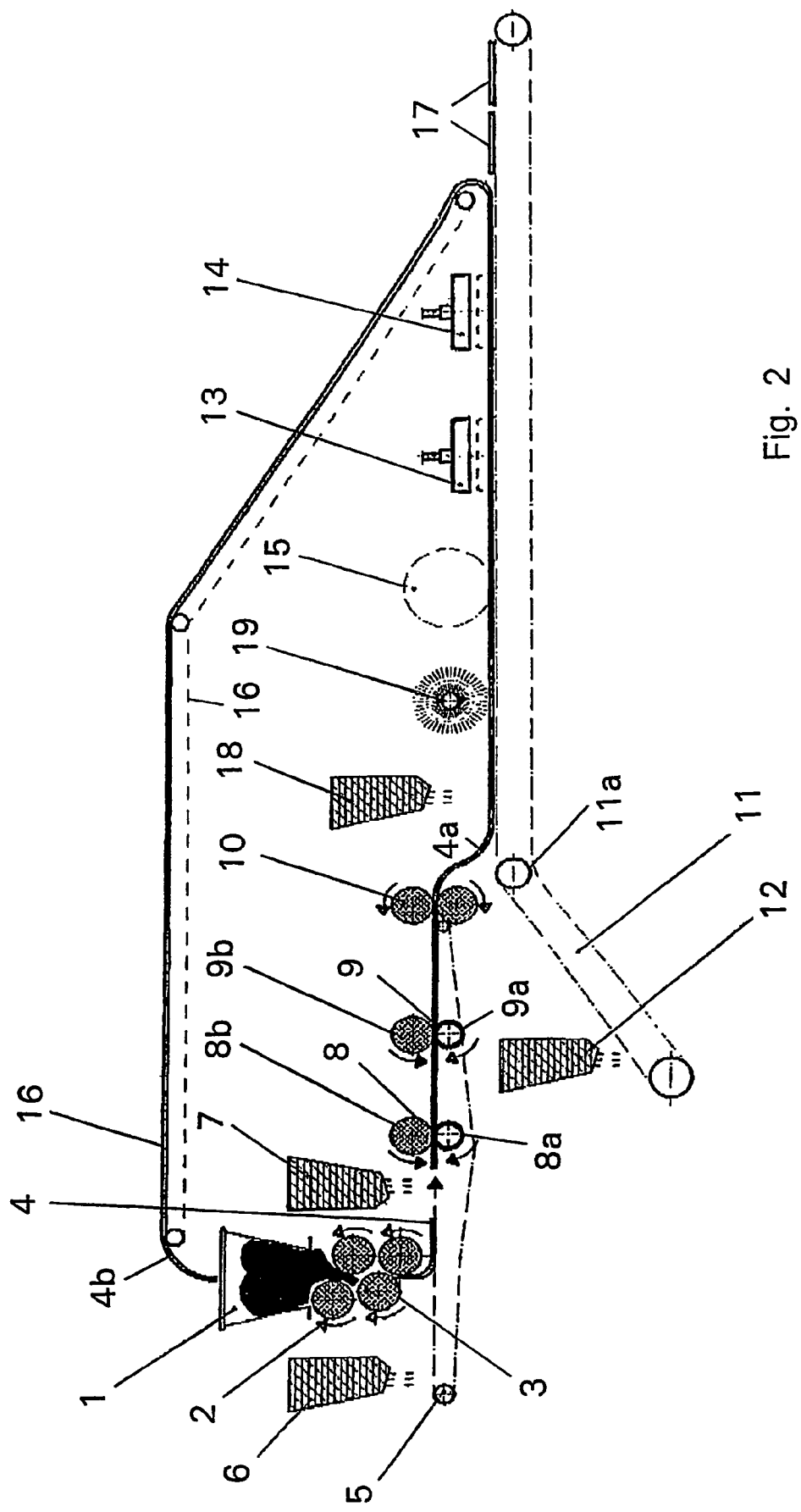
FIG. 2 shows a schematic view of the operating sections of the production line according to the invention.

The bread blank production line according to the invention incorporates a dough feeding unit comprising a dough dispenser 1 below which there are two feed rolls 2 having a substantially polygonal cross section and being adapted to rotate in opposite directions. Overlapping below these feed rolls 2 is adapted a first rolling unit 3 comprising two smooth-surfaced rolls rotatable in opposite directions and operating to form a dough sheet 4. These feed rolls 2 and smoothing rolls 3 are disposed in regard to each other such that in forming the dough sheet 4 they force the dough to pass through three roll gaps of different size in a sequence, wherein the first one has the largest gap formed by the two feed rolls 2, the next having a middle-size gap formed by one feed roll and one smooth roll of the first rolling unit, and the last gap being the smallest formed by the two smooth rolls of the first rolling unit. The thus formed dough sheet 4 is laid onto a first horizontal conveyor 5 of the production line having advantageously its receiving end disposed so far upstream past the dough dispenser that a first flour duster 6 can be located above the receiving end of this first conveyor 5 for dusting the top surface of the first conveyor 5 before the dough sheet 4 is brought into contact therewith. Immediately downstream the first rolling unit 3 is disposed a second flour duster 7 for dusting the top surface of the thus formed dough sheet 4.

In the illustrated embodiment, there are disposed two successive spreading/rolling units 8, 9 operable in conjunction with first conveyor 5 immediately downstream the second flour duster 7, each one of them comprising a spreader roll 8a, 9a acting on dough sheet 4 via first conveyor 5 and cooperating with a backing roll 8b, 9b adapted above the first conveyor so as to act in a direct contact to dough sheet 4. Advantageously, spreader roll 8a, 9a is composed by a row of adjacent eccentric cam discs which discs are arranged relative to each other so as to produce on the perimeter of the spreader roll 8a, 9a a ridge extending spirally from the middle of the roll symmetrically in a chevron shape toward both ends of the roll, which spreader roll 8a, 9a is adapted to rote at a speed substantially higher than that of the first conveyor 5 in such a way that the ridge of the spreader roll 8a, 9a forms on the dough sheet 4 depressions moving rapidly from the middle of the sheet simultaneously toward both edges of the sheet thus causing spreading/thinning of the dough sheet and simultaneously a decrease of internal stresses in the dough sheet. A more efficient relief of internal stresses in the dough sheet 4 can be attained by further providing the production line with one or more successive spreading/rolling units 8, 9.

To the exit end of the first conveyor is adapted a second rolling unit 10 serving to trim the dough sheet 4 to its final width and thickness.

The roll gaps of both rolling units 3, 10 as well as both spreading/rolling units 8, 9 are adapted individually adjustable.

The trimmed dough sheet 4a leaving the second rolling unit 10 is brought onto a second substantially horizontal conveyor 11 having its receiving end extending downward tilted, advantageously at a ramping angle of about 30°, so as to reach below the second rolling unit 10 and the spreading/rolling units 8, 9 thus permitting a flour duster 12 of the second conveyor 11 to be adapted in the space between the first conveyor 5 and the receiving end of the second conveyor 11 for dusting the top surface of the second conveyor 11, before the trimmed dough sheet 4a is brought onto the second conveyor 11, thus facilitating the release of the dough sheet at a later stage of the forming process.

Operable in conjunction with the second conveyor 11 is adapted a bread blank forming/releasing means 13, 14 that according to a preferred embodiment comprises two successively disposed stamping units with changeable forming molds having the stamping movement of the units adapted compliant to the movement of the dough sheet 4a, and thus to the movement of the second conveyor 11. Of these means, the first stamping unit 13 performs the initial forming of the bread blank, while the second stamping unit 14 carries out the final separation of bread blanks 17 from dough sheet 4a.

The production line may also be provided with a rotary cutter 15 operable in conjunction with the second conveyor 11. By means of the rotary cutter 15, it is possible to cut for instance round bread blanks 17 having the shape of a pizza crust from the dough sheet 4a.

Optionally, downstream the second rolling unit 10, it is possible to adapt one more flour duster 18 for dusting the top surface of the trimmed dough sheet 4a if necessary. Downstream this flour duster 18 in the travel direction of dough sheet 4a a dusting brush 19 may be adapted serving to smooth the flour layer dusted on the dough sheet 4a before the dough sheet 4a enters the bread blank forming/releasing means 13, 14. As a result, no separate dusting of the stamping means 13, 14 is necessary.

In the travel direction of the trimmed dough sheet 4a, downstream the bread blank forming/releasing means, is adapted a picking/return line 16 of scrap 4b remaining from the dough sheet 4a after the separation of bread blanks 17 therefrom. By means of this picking/return line 16 excess dough, especially edge scraps trimmed off from the dough sheet 4a and other scrap portions of the dough remaining after the separation of the bread blanks 17, are picked away from the surface of the second conveyor 11 by means of electrical sensor means and then the scraps are returned into the dough dispenser 1 of the production line, provided that the product to be produced permits dough scraps passed through the production line to be recycled.

Bread blanks 17 detached from the exit end of the second conveyor 11 are transferred either directly into a baking oven or, alternatively, batched onto baking oven shelves provided that the exit end of the second conveyor 11 is designed to operate as a reciprocating load delivery end 20.

What is claimed is:

1. A production line for bread blanks, characterized in that it comprises:
    a dough dispenser unit (1, 2) with a first rolling unit (3) cooperating with the same for preparing a dough sheet (4),
    a first conveyor (5) for receiving the dough sheet (4),
    at least one successive spreading/rolling unit (8, 9) arranged operable in conjunction with the first conveyor (5) in such a fashion that a spreader roll (8a, 9a) of each unit is located facing the underside surface of said conveyor (5) with a backing roll (8b, 9b) of the unit positioned above said conveyor (5) in a direct contact with the top surface of the dough sheet (4),
    a second rolling unit (10) arranged to the exit end of the first conveyor (5) for trimming the dough sheet (4) to its final width and thickness,
    a second conveyor (11) for receiving the trimmed dough sheet (4a), and
    operable in conjunction with the second conveyor (11), a forming/releasing means (13, 14) for forming/releasing bread blanks (17) from the trimmed dough sheet (4a) traveling along with the second conveyor (11).

2. The production line for bread blanks of claim 1, characterized in that in the travel direction of the dough sheet (4, 4a) downstream the forming/releasing means (13, 14) of bread blanks a return line (16) of dough sheet scraps (4b) is disposed for returning excess dough to the dough dispenser (1) of the production line, wherein the picking of the edge scraps and stamped hole pieces remaining from the dough sheet (4a) is arranged to take place by electrical means.

3. The production line for bread blanks of claim 1, characterized in that said bread blank forming/releasing means (13, 14) comprises two successively operable stamping units with changeable forming molds having the stamping movement of the units adapted compliant to the movement of the dough sheet (4a), and thus to the movement of the second conveyor (11).

4. The production line for bread blanks of claim 3, characterized in that said bread blank forming/releasing means (13, 14) also includes a rotary cutter (15).

5. The production line for bread blanks of claim 1, characterized in that the receiving ends of said first conveyor (5) and said second conveyor (11) are displaced at a distance from the point where the dough sheet (4, 4*a*) comes into a contact with the respective conveyor (5, 11).

6. The production line for bread blanks of claim 5, characterized in that the receiving end portion of the second conveyor (11) preceding said point is tilted downward by means of track turning rollers (11*a*) at an acute angle, advantageously about 30°, with the horizontal plane.

7. The production line for bread blanks of claim 6, characterized in that a flour duster (6, 12) is located above the receiving end of either one of said conveyors (5, 11) for dusting the top surface of either conveyor (5, 11) upstream the point where the dough sheet (4, 4*a*) comes into contact with the top surface of the respective conveyor (5, 11).

8. The production line for bread blanks of claim 7, characterized in that immediately downstream the first rolling unit (3) and, possibly, also downstream the second rolling unit (10), a flour duster (7, 18) is arranged for dusting the top surface of the rolled dough sheet (4, 4*a*).

9. The production line for bread blanks of claim 8, characterized in that after the flour duster (18) located downstream the second rolling unit (10) is adapted a dusting brush (19) serving to smooth the flour layer dusted on the trimmed dough sheet (4*a*).

10. The production line for bread blanks of claim 1, characterized in that the exit end of second conveyor (11) is designed to operate as a reciprocating load delivery end 20 for feeding bread blanks (17) onto baking oven shelves.

11. The production line for bread blanks of claim 2, characterized in that said bread blank forming/releasing means (13, 14) comprises two successively operable stamping units with changeable forming molds having the stamping movement of the units adapted compliant to the movement of the dough sheet (4*a*), and thus to the movement of the second conveyor (11).

12. The production line for bread blanks of claim 2, Characterized in that the exit end of second conveyor (11) is designed to operate as a reciprocating load delivery end 20 for feeding bread blanks (17) onto baking oven shelves.

13. The production line for bread blanks of claim 3, Characterized in that the exit end of second conveyor (11) is designed to operate as a reciprocating load delivery end 20 for feeding bread blanks (17) onto baking oven shelves.

14. The production line for bread blanks of claim 4, Characterized in that the exit end of second conveyor (11) is designed to operate as a reciprocating load delivery end 20 for feeding bread blanks (17) onto baking oven shelves.

15. The production line for bread blanks of claim 5, Characterized in that the exit end of second conveyor (11) is designed to operate as a reciprocating load delivery end 20 for feeding bread blanks (17) onto baking oven shelves.

16. The production line for bread blanks of claim 6, Characterized in that the exit end of second conveyor (11) is designed to operate as a reciprocating load delivery end 20 for feeding bread blanks (17) onto baking oven shelves.

17. The production line for bread blanks of claim 7, Characterized in that the exit end of second conveyor (11) is designed to operate as a reciprocating load delivery end 20 for feeding bread blanks (17) onto baking oven shelves.

18. The production line for bread blanks of claim 8, Characterized in that the exit end of second conveyor (11) is designed to operate as a reciprocating load delivery end 20 for feeding bread blanks (17) onto baking oven shelves.

19. The production line for bread blanks of claim 9, Characterized in that the exit end of second conveyor (11) is designed to operate as a reciprocating load delivery end 20 for feeding bread blanks (17) onto baking oven shelves.

20. The production line for bread blanks of claim 11, Characterized in that the exit end of second conveyor (11) is designed to operate as a reciprocating load delivery end 20 for feeding bread blanks (17) onto baking oven shelves.

* * * * *

UNITED STATES PATENT AND TRADEMARK OFFICE
CERTIFICATE OF CORRECTION

PATENT NO. : 7,021,205 B2  
APPLICATION NO. : 10/488765  
DATED : April 4, 2006  
INVENTOR(S) : Pekka Leppaniemi Page 1 of 1

It is certified that error appears in the above-identified patent and that said Letters Patent is hereby corrected as shown below:

Title page, item (22) PCT Filed: "Sep. 19, 2003" should read:

--March 19, 2003--.

Signed and Sealed this

Eighth Day of August, 2006

JON W. DUDAS  
*Director of the United States Patent and Trademark Office*